Feb. 4, 1930.     S. E. B. SODERBERG     1,745,917
PRESSURE REGULATOR
Filed April 29, 1927     2 Sheets-Sheet 1
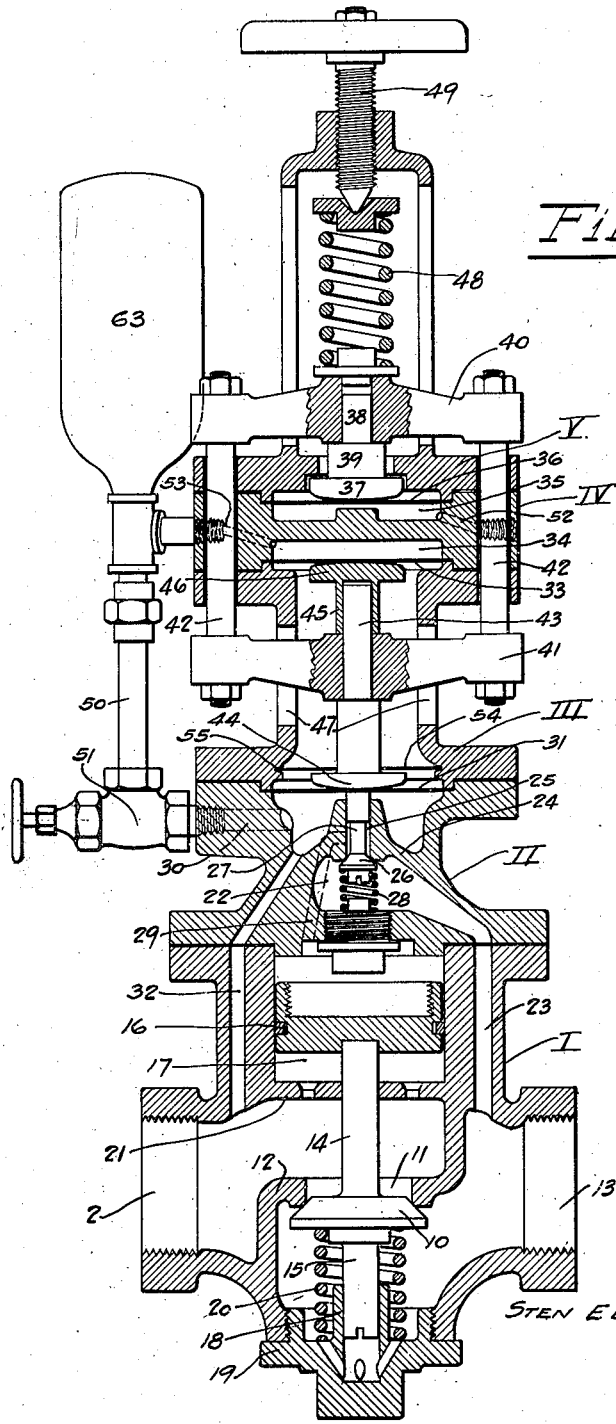
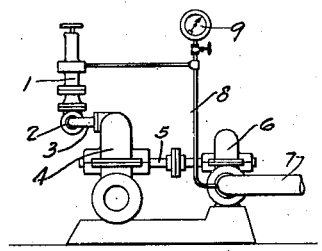
STEN E.B. SODERBERG  INVENTOR.
BY *O. V. Thiele*
ATTORNEY.

Feb. 4, 1930. S. E. B. SODERBERG 1,745,917
PRESSURE REGULATOR
Filed April 29, 1927 2 Sheets-Sheet 2

STEN E. B. SODERBERG, INVENTOR.

BY O. V. Thiele

ATTORNEY.

Patented Feb. 4, 1930

1,745,917

UNITED STATES PATENT OFFICE

STEN ERIC BERNHARD SODERBERG, OF LYNDHURST, NEW JERSEY, ASSIGNOR TO LESLIE COMPANY, OF LYNDHURST, NEW JERSEY, A CORPORATION OF NEW JERSEY

PRESSURE REGULATOR

Application filed April 29, 1927. Serial No. 187,471.

The invention relates to pressure regulators such as shown in United States Patent 1,369,691 to Metzger, and has for its object the provision of apparatus of this type which shall be extremely sensitive and yet have no tendency to over-regulate or "hunt."

Figure 4:
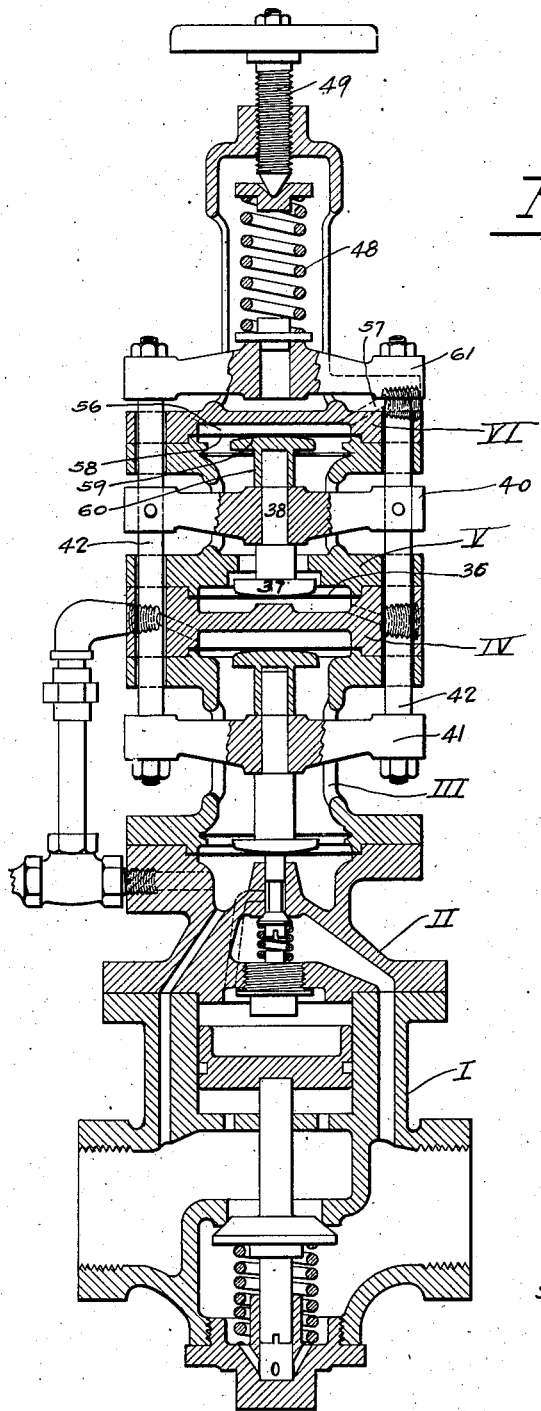
Figure 3:
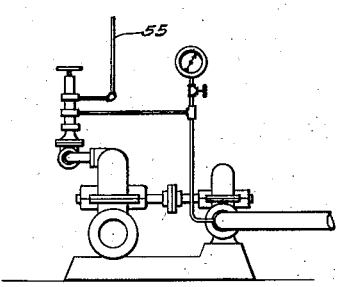

The invention is illustrated in the accompanying drawings in which Fig. 1 shows my improved regulator applied to a turbine-driven pump.; Fig. 2 shows a longitudinal sectional view of the regulator; Fig. 3 shows a view similar to that of Fig. 1 for another form of regulator utilizing the principle of my invention; and Fig. 4 is a view similar to that of Fig. 2 of this second form of regulator.

The outlet 2 of the regulator 1 delivers steam at reduced pressure through the pipe 3 to the steam turbine 4. This turbine drives the pump 6 through the shaft 5. The water or other fluid handled by the pump is delivered by it to the pipe 7 by which it is delivered to the desired point. Pipe 8 connects this outlet to a certain chamber in the regulator. 9 is a pressure gauge indicating the pressure existing in the pipe 8 and the delivery pipe 7.

The regulator is for convenience of manufacture made in five parts, referred to by the roman numerals I, II, III, IV, and V respectively. I, the lowest one of these, has in it the valve 10, controlling the port 11 in the partition 12, which separates the inlet 13 from the outlet 2. This valve has an upwardly extending stem 14 and a downwardly extending stem 15. The former carries a piston 16, which reciprocates in the cylindrical chamber 17. The stem 15 is guided in the hollow projection 18 of the cap 19 which closes the bottom of the valve body I. The spring 20, surrounding projection 18 and stem 15 and engaging the bottom of valve 10 and the upper side of cap 19, urges valve 10 toward its seat. The chamber 17 is separated from the outlet of the valve by the perforated partition 21.

The part II has a cavity 22 connected by the passage 23 to the inlet 13, and separated from the upper interior portion by the top wall 24. This partition 24 has a cylindrical perforation 25, through which extends the stem of the valve 26. This stem has a reduced portion 27. The valve 26 is urged toward its upper position by the spring 28. From the portion of the port 25 opposite the reduced portion 27 of the stem leads the duct 29 connecting it to the space in part I above the piston 16. The upper end of the stem 27 abuts against the diaphragm 31, which is clamped between the two pieces II and III. A duct 30 leads out from the upper interior portion of the piece II, and a second duct 32 connects it with the outlet of the valve housed in piece I.

Piece III may be termed a distance piece, spacing pieces II and IV. Between it and piece IV is clamped the diaphragm 33, which closes the lower cavity 34. An upper cavity 35 of piece IV is closed at the top by the diaphragm 36, clamped between the two pieces IV and V.

Against the upper side of diaphragm 36 bears the head 37, from which extends upward the stem 38. This stem has a shoulder 39, which bears against the lower side of the cross-arm 40. The cross-arm 40 is rigidly connected to the lower cross-arm 41 by means of the two side rods 42—42. Through the lower cross-arm 41 extends the stem 43 which has a shoulder engaging the lower side of the arm and a head 44, engaging the diaphragm 31. The stem 43 extends into the hollow stem 45, whose lower end engages the top side of arm 41 and whose upper end carries the head 46, which engages the lower side of diaphragm 33.

It should be mentioned that the two diaphragms 31 and 33 are of the same size.

The upper side of arm 40 is pressed on by spring 48 the compression of which can be adjusted by means of screw 49.

The chamber 34 is provided with an outwardly extending duct 53 which is connected to the duct 30 by piping 50. This piping has in it the needle valve 51 and is preferably provided with a steam chamber 63.

The chamber 35 has a duct 52 leading from it whose outer end is connected by pipe 8 (see Fig. 1) to the outlet from the pump.

54 is a thin metal guide which is sprung into place in its groove 55 and guides the lower end of stem 43.

The operation of the device will now be understood from the following statement.

The pressure which it is desired to keep constant is that of the liquid delivered by the pump 6 into the pipe 7. If this pressure should drop for any reason, spring 48 presses diaphragm 36 downward a little further, since the pressure under this diaphragm has also diminished. At the same time the head 44 will press diaphragm 31 down further by the same amount as the two heads are rigidly fixed to each other. Control valve 26 will thus be opened a little further, and steam can flow more freely into the annular space around the reduced portion 27 of the stem. The steam supply to the space above the piston through the duct 29 is thus increased and the piston will be depressed more against the spring 20, the main valve 10 thus being opened more. More steam is thus admitted to the turbine, thereby speeding it up and raising the pressure of the liquid delivered by the pump.

Should the pressure in the delivery line 7 increase, on the other hand, diaphragm 31 is forced upward, permitting spring 28 to close control valve 26 more. Steam pressure above piston 16 drops on account of leakage past the piston, and the main valve 10 is forced nearer to its seat by spring 20, thus slowing up the turbine and the pump and diminishing the pressure in pipe 7.

The increase or decrease in pressure on the low pressure side of valve 10 caused by the change of position of the valve will be transmitted by duct 32 to the chamber under diaphragm 31, and thence by piping 50 to chamber 34. If the needle valve 51 is wide open, the net effect of the increase or decrease of pressure is nil as far as these two diaphragms are concerned, as they are of equal area and are acted on in opposite directions, the change in pressure being transmitted to both of them practically simultaneously. The two act merely as seals, and will not interfere with the operation of the regulator. Their purpose however is accomplished by throttling down the needle valve 51 to overcome so-called "hunting." If in answer to an undue drop of pressure in pipe 7 valve 26 has opened and piston 16 has carried valve 10 down to open it further, and, as often happens, these movements are a little greater than required, then an opposite correction will occur, which in turn may be larger than necessary. It may be some time before equilibrium is again reached. This is a very undesirable condition and is readily eliminated with the present improvement. By throttling down the needle valve 51, the upward or downward movement due to a change of pressure in chamber 35 of valve 26 is quickly checked by the change in the resultant pressure in the low pressure steam being transmitted at first only to the chamber under diaphragm 31, where it opposes the action of head 44; and only slowly thence to chamber 34, where it aids such action. The result is a stabilization and entire elimination of hunting.

The force of this compensating or stabilizing effect can be controlled by an adjustment of the needle valve 51.

The chamber 63 may be omitted in some cases and the apparatus then functions as so far described. If the delay between the times that the diaphragms 31 and 33 come into action is insufficient, this period can be increased by the addition of the chamber 63. The upper diaphragm will then not become subject to a pressure equal to that acting on diaphragm 31 until the pressure in the reservoir 63 has also risen to this point. This evidently prolongs the period of establishing balance between the two diaphragms; and by means of this provision and the needle valve a great latitude of this time lapse is made possible.

The principle of the balancing diaphragms can be extended and utilized in other modifications of this general type of valve. A modified form of applying it is illustrated in Figs. 3 and 4. The particular purpose of this particular arrangement is the following:

A regulator such as first described will keep the pressure of the liquid delivered by the pump constant within very narrow limits. If the liquid delivered is water for a boiler it will deliver such water to the boiler at such constant pressure,—and it will do this irrespective of possible variations in the boiler pressure. Obviously what should properly be kept constant is not the delivery pressure but the difference between the delivery pressure and the boiler pressure. This is made possible by the apparatus now to be described.

An inspection of Fig. 3 will show that there is an additional pipe connection, numbered 55. This leads from the steam or water space of the boiler and transmits boiler pressure to the valve.

The valve itself is like the form of the first two figures throughout the pieces I, II, III, and IV, including diaphragm 35 and the head 37 pressing on it and the stem 38. The stem 38 also is fixed to the cross-arm 40, which is rigidly connected to the lower cross-arm 41 by the side rods 42—42.

The piece V is shaped to serve as a distance piece between the pieces IV and VI, the latter being an additional piece having no counterpart in the first form. It contains the chamber 56, with which the pipe 55 communicates through the duct 57. The lower side of this chamber is closed by the diaphragm 58, against the lower side of which bears the head 59. This head has a hollow, downwardly extending stem 60, slipped on an upward extension of stem 38. The shoulder of stem 38 and the end of hollow stem 60 abut against the opposite sides of the cross-arm 40.

The side arms 42 extend upwardly beyond arm 40 and are rigidly connected to the cross-arm 61, the cross-arm 40 being secured to them by pins. The uppermost cross-arm, 61, is pressed downward by the spring 48, whose tension is regulable by means of the screw 49.

It will be obvious that this valve functions just as the one first described except that whereas in the first form the position of the control valve and therefore ultimately the position of the steam valve 10 and the speed of the pump were affected by a change in the pressure in pipe 8 acting on diaphragm 35, in this second form they are affected by the oppositely acting boiler and feedwater pressures, and therefore by their difference.

In this form, incidentally the chamber 63 has been omitted although it can obviously be used here also if required.

What I claim is:—

1. In apparatus of the class described the combination of a main valve controlling the admission of actuating fluid to a pump; fluid pressure actuated means to operate the main valve in one direction; a control valve controlling the flow of said fluid to said valve actuating means; a spring tending to move the main valve in the opposite direction; a diaphragm subject on one side to pressure from the pump delivery; rigid means to transmit motion of the diaphragm to the control valve; and stabilizing means preventing rapid fluctuations of the positions of the main and control valves comprising two parallel diaphragms whose opposed inner surfaces contact with said rigid means, and whose outer surfaces are subject to pressure from the pump-actuating fluid that has passed the main valve, and means to delay the transmission of pressure fluctuations to one of said last named two diaphragms.

2. In apparatus of the class described the combination of a main valve controlling the admission of actuating fluid to a pump; a control valve whose position affects the position of the main valve; a diaphragm chamber subject to pressure from the pump delivery; rigid means to transmit motion of the diaphragm to the control valve; and stabilizing means to prevent rapid fluctuations of the positions of the main and control valves; said means comprising two diaphragm chambers the diaphragm of one of which acts directly on the control valve, and a rigid constant length member extending between the two diaphragms, said chambers being connected by a valved conduit, one of the chambers being in direct communication with the outlet side of the main valve.

3. In apparatus of the class described the combination of a main valve controlling the admission of actuating fluid to a pump; a control valve whose position affects the position of the main valve; a diaphragm bearing against and affecting the position of the control valve; a second diaphragm; a third diaphragm; each of said diaphragms closing a chamber; a rigid member having three heads bearing against the three diaphragms; the heads bearing against the diaphragms of the first and second chambers extending in opposite directions, and the third head extending in the same direction as the first; a spring pressing on the rigid member and urging the first and third heads against their diaphragms; means to subject the third diaphragm chamber to pressure from the pump delivery; conduits connecting the first and second chambers to the outlet of the main valve; and means to delay the transmission of fluctuations in the pressure to the second chamber.

4. In apparatus of the class described the combination of two chambers; two parallel juxtaposed diaphragms closing them; a third chamber closed on the side away from the first two chambers by a diaphragm parallel to the other two diaphragms; a rigid member comprising three heads bearing against the three diaphragms; a spring urging the rigid member in a direction against the third diaphragm; a main valve controlling the admission of actuating fluid to a pump; a controlling valve whose position affects the position of the main valve; the position of the rigid member affecting that of the control valve; means to admit pressure from the pump outlet to the third chamber; and means to admit pressure from the main valve outlet to the other two chambers.

5. In apparatus of the class described the combination of two chambers; two parallel juxtaposed diaphragms closing them; a third chamber closed on the side away from the first two chambers by a diaphragm parallel to the other two diaphragms; a rigid member comprising three heads bearing against the three diaphragms; a spring urging the rigid member in a direction away from the third diaphragm; a main valve controlling the admission of actuating fluid to a boiler feed pump; a control valve whose position affects the position of the main valve; the position of the rigid member affecting that position of the control valve; means to admit pressure from the boiler to the third chamber; and means to admit pressure from the main valve outlet to the other two chambers.

6. In apparatus of the class described the combination of four superposed chambers the upper two being closed by diaphragms on the sides facing each other and the lower two being closed by diaphragms on the sides facing each other; a rigid member comprising four heads bearing against the four diaphragms; a spring urging the rigid member against two of the diaphragms; a main valve controlling the admission of actuating fluid to a boiler feed pump; a control valve whose position affects the position of the main valve; the position of the rigid member affecting that of the control valve; means to admit boiler pressure to one of said chambers, pump delivery pressure to the second, and actuating fluid pressure from the main valve outlet to the other two chambers.

7. In apparatus of the class described the combination of two chambers; two horizontal juxtaposed diaphragms closing them; a third chamber above the first two closed at the top by a horizontal diaphragm; three rigidly connected heads bearing against the three diaphragms; a compression spring urging the top and lowest heads toward their diaphragms; a main valve controlling the admission of actuating fluid to a pump; a control valve actuated by the lowest diaphragm and whose position affects the position of the main valve; a conduit from the pump outlet to the top chamber; a conduit from the main valve outlet to the lowest and middle chambers; and a valve adapted to throttle the said conduit to the middle chamber.

STEN ERIC BERNHARD SODERBERG.